US005729590A

United States Patent [19]
Dimitriadis et al.

[11] Patent Number: 5,729,590
[45] Date of Patent: Mar. 17, 1998

[54] ACKNOWLEDGE BACK PAGER USING SECONDARY TRANSMISSION SOURCE

[75] Inventors: Dimitri Dimitriadis, Lake Oswego; Garold B. Gaskill, Tualatin, both of Oreg.

[73] Assignee: Seiko Communications Holding N.V., Netherlands Antilles

[21] Appl. No.: 695,747

[22] Filed: Aug. 12, 1996

Related U.S. Application Data

[63] Continuation of Ser. No. 304,728, Sep. 12, 1994, abandoned.

[51] Int. Cl.⁶ .................................................... H04Q 7/00
[52] U.S. Cl. ........................ 379/57; 379/57; 340/825.44
[58] Field of Search ............................ 379/58, 59, 56, 379/57; 455/343, 127, 11.1; 340/311.1, 825.44

[56] References Cited

U.S. PATENT DOCUMENTS

| | | | |
|---|---|---|---|
| 4,644,351 | 2/1987 | Zabarsky et al. | 340/825.44 |
| 4,713,808 | 12/1987 | Gaskill et al. | 370/94 |
| 4,811,379 | 3/1989 | Grandfield | 340/825.44 |
| 4,823,123 | 4/1989 | Siwik . | |
| 4,875,038 | 10/1989 | Siwiak . | |
| 4,882,579 | 11/1989 | Siwiak . | |
| 4,891,637 | 1/1990 | Siwiak . | |
| 4,897,835 | 1/1990 | Gaskill et al. | 370/94.1 |
| 4,928,096 | 5/1990 | Leonardo et al. | 340/825 |
| 4,940,963 | 7/1990 | Gutman . | |
| 4,951,044 | 8/1990 | Nelson et al. | 340/825 |
| 5,070,329 | 12/1991 | Jasinski | 340/825 |
| 5,117,460 | 5/1992 | Berry et al. | 381/41 |
| 5,124,697 | 6/1992 | Moore . | |
| 5,142,279 | 8/1992 | Jasinski . | |
| 5,142,692 | 8/1992 | Owen | 455/48 |
| 5,148,469 | 9/1992 | Price | 379/57 |
| 5,150,110 | 9/1992 | Breeden | 340/825 |
| 5,153,582 | 10/1992 | Davis . | |
| 5,155,479 | 10/1992 | Ragan | 340/825 |
| 5,159,331 | 10/1992 | Park et al. | 340/825 |
| 5,162,790 | 11/1992 | Jasinski | 340/825 |
| 5,166,932 | 11/1992 | Hoff et al. | 370/95.1 |
| 5,170,487 | 12/1992 | Peek | 455/45 |
| 5,185,604 | 2/1993 | Nepple et al. | 340/825.44 |
| 5,187,470 | 2/1993 | King et al. | 340/825.44 |
| 5,189,413 | 2/1993 | Gaskill et al. | 340/825.44 |
| 5,220,366 | 6/1993 | King | 354/76 |
| 5,260,700 | 11/1993 | Merchant et al. | 340/825.44 |
| 5,311,516 | 5/1994 | Kuznicki et al. | 370/94.1 |
| 5,404,569 | 4/1995 | Schwendeman | 455/13.4 |
| 5,574,771 | 11/1996 | Driessen et al. | 379/57 |

FOREIGN PATENT DOCUMENTS

| | | |
|---|---|---|
| 8806830 | 9/1988 | WIPO . |
| WO-A-88/06830 | 9/1988 | WIPO . |

OTHER PUBLICATIONS

"High Speed Subcarrier Is Wave of Future" by Lyle Henry, Guest Commentary, *Radio World*, Jun. 1, 1994.

*Primary Examiner*—Dwayne Bost
*Assistant Examiner*—Myron K. Wyche
*Attorney, Agent, or Firm*—Elmer Galbi

[57] ABSTRACT

A pager receives a wireless telecommunication message from central paging terminal. Upon successful transmission of the message to the pager, the message is acknowledged initiating transmission of an acknowledge signal from the pager. The pager transmits the acknowledge signal to one of a variety of different secondary transmission sources. The secondary transmission source then relays the acknowledge signal back to a receiver associated with the central paging terminal. The acknowledge signal is either physically initiated by depressing a switch on the pager or is automatically initiated by the pager upon receiving the message. Energy efficiency of the pager is further increased by periodically broadcasting and polling for available secondary transmission sources.

5 Claims, 5 Drawing Sheets

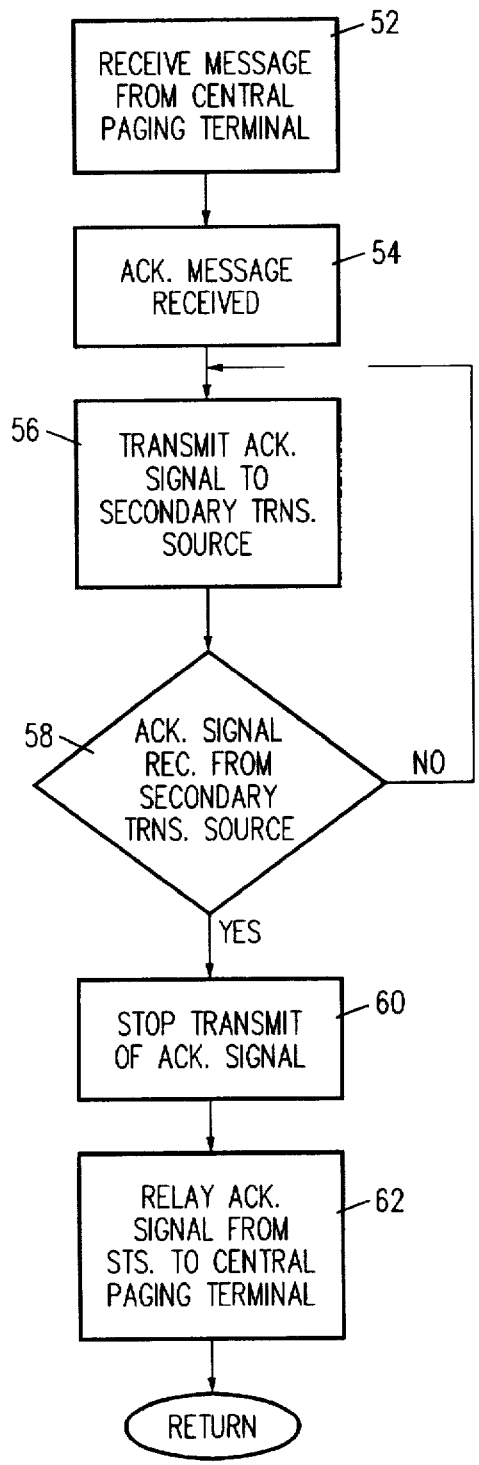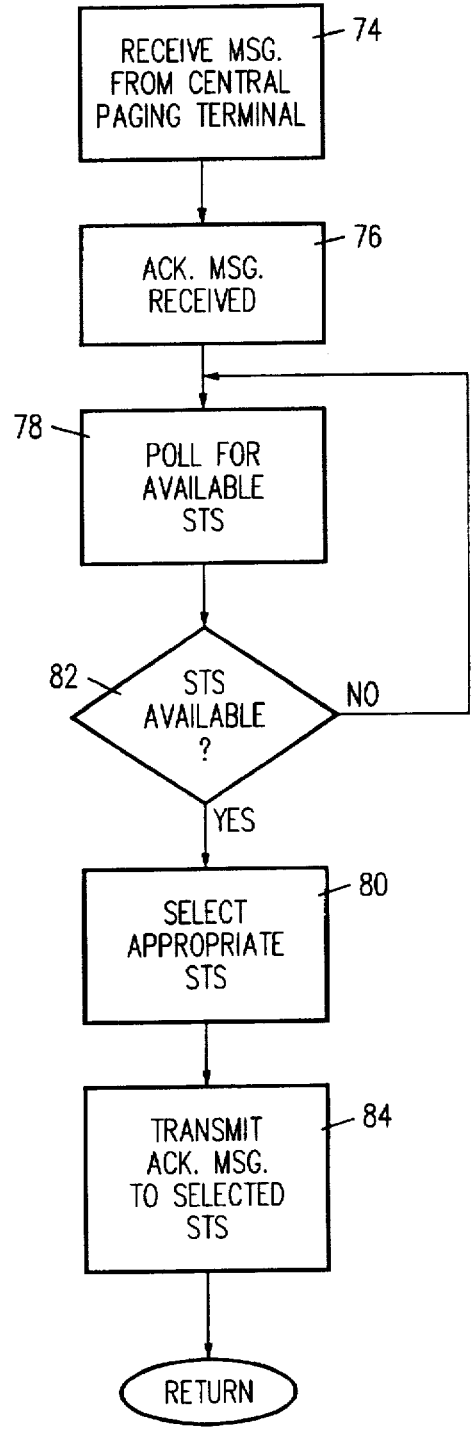
FIG. 4
FIG. 6

ACKNOWLEDGE BACK PAGER USING SECONDARY TRANSMISSION SOURCE

This application is a continuation of application Ser. No. 08/304,728, filed Sep. 12, 1994 which is now abandoned.

BACKGROUND OF THE INVENTION

This invention relates generally to paging systems that acknowledge receipt of transmitted messages and more particularly to utilizing a second transmission source for relaying a pager acknowledge signal.

U.S. Pat. Nos. 4,875,038, 4,882,579 and 4,891,637 all to Siwiak describe acknowledge back paging systems that first receive a wireless telecommunication message from a central paging terminal. The pager then transmits a signal back to the central paging terminal acknowledging that the message has been received.

The paging systems in Siwiak, however, require that the pager transmit the acknowledge signal directly back to the physical location of the central paging terminal. Since pagers are portable, a substantial distance may exist between the pager and the central paging terminal. Because portable pager batteries are also small, there is not sufficient battery power to effectively transmit an acknowledge signal over long distances.

The pagers as shown in Siwiak transmit an acknowledge signal after successfully receiving a transmitted message. If the central paging terminal is outside of the transmission range of the pager, the pager needlessly expends battery power sending an acknowledge signal that cannot be received. Thus, the battery supply for the pager is inefficient and over utilized. If the pager continues to remains outside this limited transmission range, the acknowledge signal accordingly will not be transmitted. Thus, the message sender will not know if the message was received by the pager.

Accordingly, a need remains for a pager that can acknowledge messages from a wider transmission range in a more energy efficient manner.

SUMMARY OF THE INVENTION

It is, therefore, an object of the invention to increase energy efficiency when transmitting acknowledge signals from a portable pager.

Another object of the invention is to increase utilization of secondary communication sources in paging systems.

A further object of the invention is to increase the operating range of paging systems for acknowledging oneway telecommunication messages.

A paging system utilizes existing communication sources to relay an acknowledge signal back to a central paging terminal. The pager receives a wireless telecommunication message from the central paging terminal. The message is acknowledged by the pager operator initiating an acknowledge signal. The pager then transmits the acknowledge signal to one of a variety of different secondary transmission sources. The secondary transmission source then relays the acknowledge signal back to a receiver associated with the central paging terminal.

Different acknowledge and receive signals are initiated either physically by depressing a switch on the pager or electronically by the pager upon receiving the message. The acknowledge and receive signals are then automatically transmitted at a predetermined periodic rate until successfully received by the secondary transmission source.

Since the pager utilizes a secondary transmission source (STS), acknowledge signals can be effectively transmitted from longer distances while at the same time requiring less energy from the pager power supply. The secondary transmission source is provided by a variety of different communication systems. For example, the acknowledge signal is relayed from the pager to the central pager terminal by a cellular phone, personal computer or a hardwired public telephone.

Energy efficiency of the pager is further increased by polling for available secondary transmission sources. In this embodiment, the pager periodically checks for available secondary transmission sources and then selects one of the available sources for relaying the acknowledge signal. Thus, the pager only transmits when a secondary transmission source is close enough to receive the pager acknowledge signal.

The acknowledge signal is automatically transmitted at different periodic rates according to the amount of time required to successfully relay the signal to the secondary transmission source. For example, the acknowledge signal may be immediately and continuously transmitted after the appropriate acknowledgment is initiated on the pager. However, after a given amount of time without successful transmission of the acknowledge signal, the pager either manually or automatically begins transmitting the acknowledge signal at a different periodic rate. An emergency signal can also be transmitted by the pager using the same acknowledge signal infrastructure.

Thus, a portable pager automatically transmits an acknowledge signal to a secondary transmission source to allow a pager acknowledge-back capability from a pager from a wide range of locations. Piggy-backing existing communication sources also allow the pager acknowledge signal to be relayed more quickly while using less power from the pager battery supply.

The foregoing and other objects, features and advantages of the invention will become more readily apparent from the following detailed description of a preferred embodiment of the invention which proceeds with reference to the accompanying drawings.

BRIEF DESCRIPTION OF THE DRAWINGS

FIG. 4 is a block diagram showing a method for transmitting pager acknowledge signal via a secondary transmission source according to the invention.

FIG. 6 is a block diagram showing a method for polling multiple secondary transmission sources according with the paging system shown in FIG. 5.

DETAILED DESCRIPTION

Figure 1:
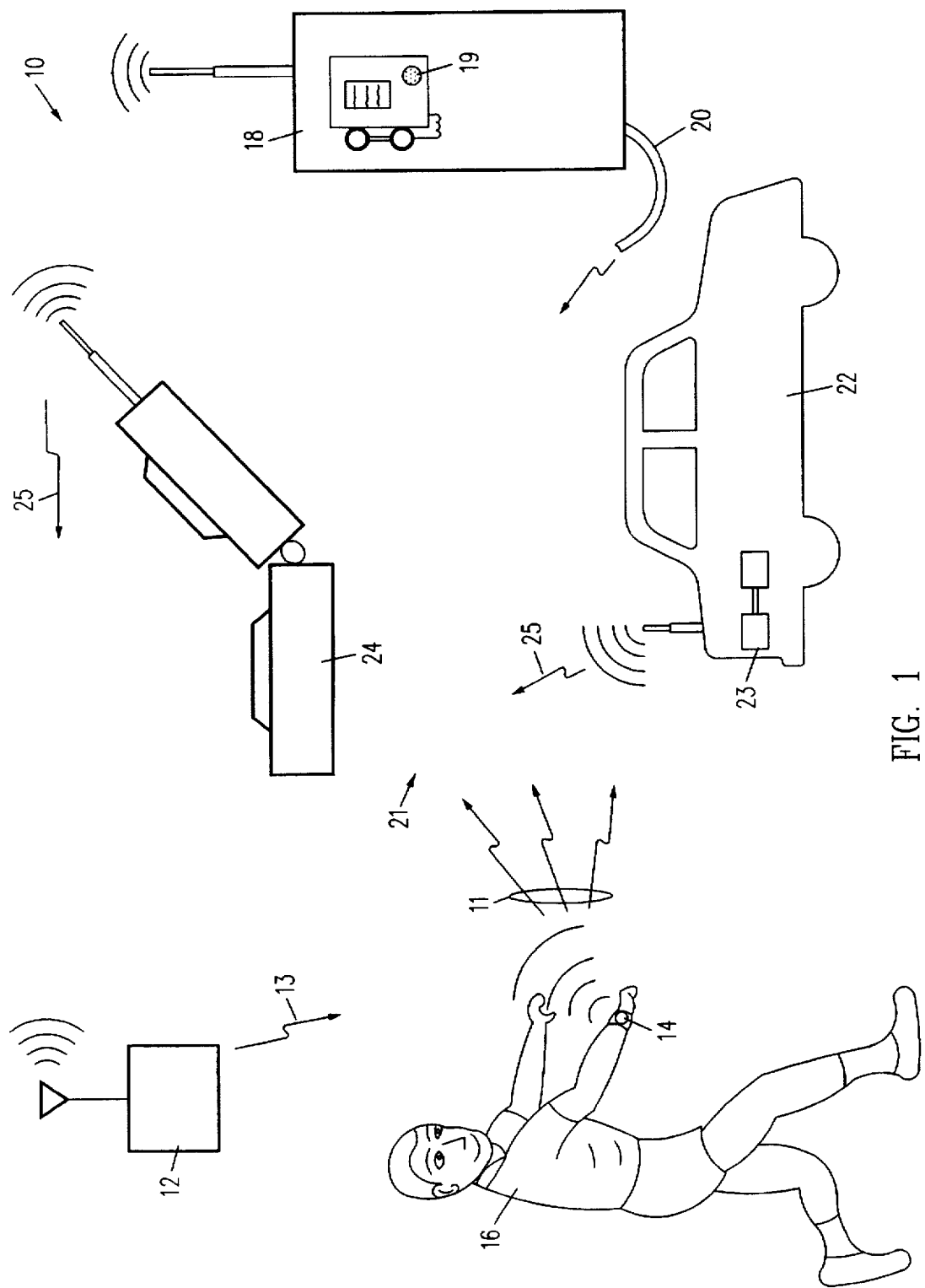
FIG. 1 is a schematic diagram showing a paging system according to the invention that transmits an acknowledge signal via a secondary transmission source.

FIG. 1 is a schematic diagram shown a paging system 10 according to the invention that transmits an acknowledge signal 11 via a secondary transmission source (STS) 21. The paging system 10 includes a pager 14 for receiving a wireless telecommunication message 13 from a central paging terminal 12. The pager 14 in FIG. 1 is a wrist pager shown attached to the arm of an operator 16. However, the invention is applicable to any portable pager. The secondary transmission source 21 is one or more existing communication devices such as a public telephone 18, third party car phone 23 or a personal cellular phone 24 belonging to operator The message 13 is initially transmitted from the central paging terminal 12 to pager 14. The operator 16 acknowledges the message 13, for example, by depressing a button (See FIG. 2) pager 14. The pager 14 then begins to automatically transmit an acknowledge signal 11 to STS 21. The STS's 21 either relay the acknowledge signal in a wireless manner, as shown by cellular phone 24 and car phone 23 signals 25 or are relayed via conventional landlines as shown by telephone line 20 coupled to public phone 18.

The STS 21 is in general physically detached from the pager 14 and defines an existing one-way or two-way communication system that is either mobile (cellular phone 24) or stationary (public phone 18). Alternatively, the pager 14 is temporarily coupled by a cable to the secondary transmission source. For example, a socket 19 in pay phone 18 receives a communication cable (not shown) that electronically couples the pager 14 and the pay phone 18 together. After being coupled together, the acknowledge signal transmitted by pager 14 is assured of being immediately received and relayed by the pay phone 18.

The technology used to communicate the acknowledge signal from the pager 14 to the STS 21 can be different than the technology used to communicate messages and signals between the central paging terminal 12, pager 14 and STS 21. For example, the original message 13 is typically transmitted using a frequency modulated (FM) signal. However, the acknowledge signal can be transmitted from the pager 14 to the STS 21 using an IR or RF signal.

By utilizing the STS 21 to relay acknowledge signals, the pager 14 is relieved of the burden of having to transmit the acknowledge signal directly back to the central paging terminal 12. Thus, the pager 14 can effectively return an acknowledge signal to the central paging terminal 12 without requiring a large power supply. Since communication systems such as public phone 18 have access to large power supplies, the majority of the energy required to relay the acknowledge signal is more efficiently transferred to the STS 21.

Figure 2:
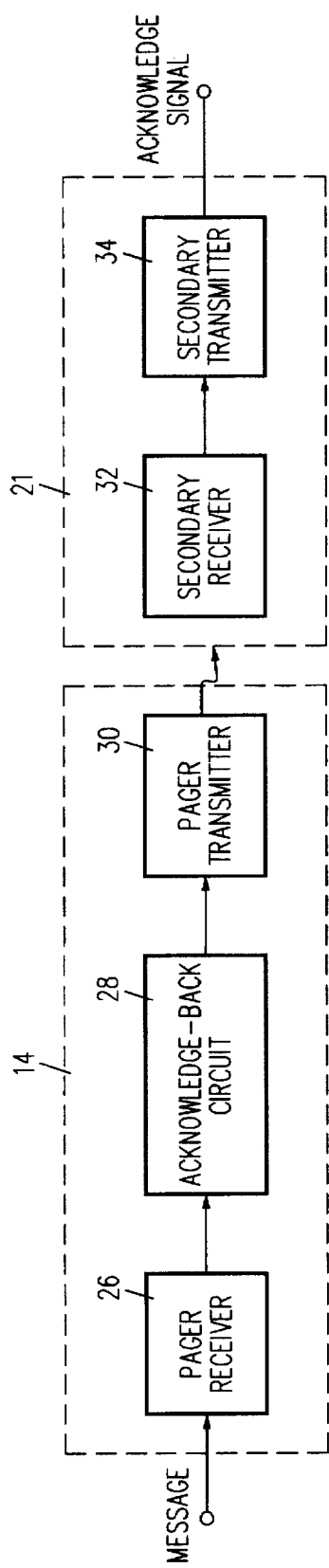
FIG. 2 is a block diagram of the different hardware components for the paging system shown in FIG. 1.

FIG. 2 is a schematic diagram showing the different hardware components located inside the pager 14 and STS 21 previously shown in FIG. 1. A receiver 26 located inside pager 14 receives a message from the central paging terminal 12 (FIG. 1). The receiver 26 relays the message to an acknowledge-back circuit 28. The acknowledge-back circuit receives the message and generates an acknowledge signal according to different control signals and acknowledge parameters that are described below in FIG. 3. The acknowledge signal is then output by a transmitter 30 located in pager 14. The STS 21 includes a receiver 32 for receiving the acknowledge signal from transmitter 30 and correspondingly relays the acknowledge signal to the central paging terminal 12 (FIG. 1) via transmitter 34.

Figure 3:
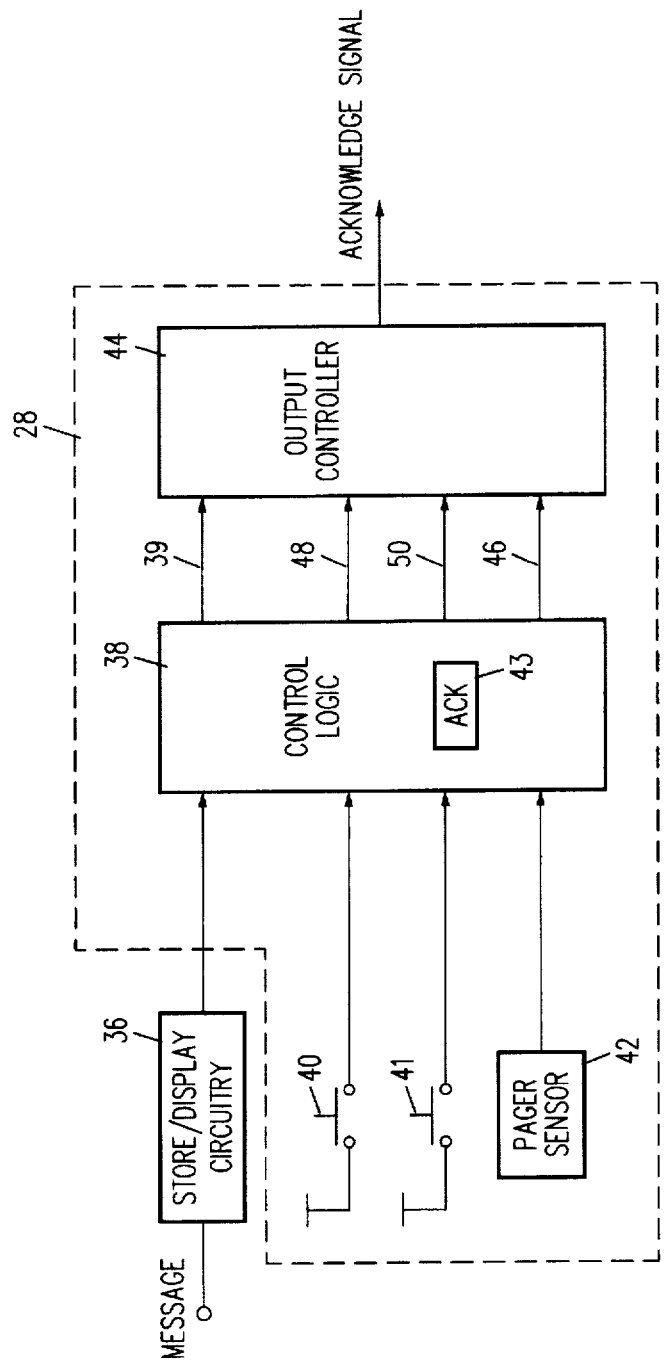
FIG. 3 is a detailed schematic diagram of an acknowledge-back circuit shown in FIG. 2.

FIG. 3 is a detailed schematic diagram of the acknowledge-back circuit 28 shown in FIG. 2. The acknowledge-back circuit 28 is coupled to pager store and display circuitry 36 that stores and displays the message from central paging terminal 12. The control logic 38 receives a physical acknowledge by depressing acknowledge button 40 in turn generating an acknowledge signal 39. Optional signals are generated by the control logic 38 according to various input stimulants. For example, an emergency signal 50 is generated by depressing an emergency button 41 and a pager status signal 46 is generated from a pager sensor 42.

The acknowledge signal 39 is output to transmitter 30 (FIG. 2) at a given periodic transmission rate according to output controller 44. The output controller 44 can transmit the acknowledge signal (or other status signals) intermittently at a selectable periodic rate or continuously.

The store and display circuit 36 feeds a signal to control logic 38 indicating receipt of a new message. The control logic remains in an unacknowledged state until acknowledge button 40 is physically depressed by operator 16 (FIG. 1). The acknowledge back circuit 38 then generates acknowledge signal 39. The control logic 38 contains a register 43 that stores the acknowledge initiation signal from button 40. After a message has been acknowledged, control logic 38 then automatically transmits the acknowledge signal 39 until received by the STS 21. After the acknowledge signal is successfully transmitted, the acknowledge register 43 is reset.

When the operator 16 acknowledges a message (e.g., depressing button 40), the pager 14 then automatically controls the remaining tasks required to successfully communicate the acknowledge signal back to the central paging terminal 12. For example, the pager may wait to send the acknowledge signal 11 at a time synchronized with activation of the STS 21 to conserve battery power. Thus, the pager operator 16 does not have to worry about reacknowledging the message if not initially received by the STS.

The additional signals (46, 48 and 50) output by the control logic 38 provide transmission of additional information in the existing pager acknowledge-back communication scheme. For example, the pager status signal 46 indicates that the pager is currently attached to user 16. The pager sensor 42 monitors the status of the pager 14 to determine whether the pager is presently attached or detached to the operator 16. For example, sensor 42 would be activated when the straps of the wrist watch pager are locked together. Or alternatively, the sensor 42 is activated by a motion detector that indicates that the pager is presently being carried by the operator 16. If the pager is currently attached to operator 14, the control logic 38 will automatically initiate transmission of the pager status signal 46 after receiving a message. Thus, a message sender is informed whether the transmitted message was sent to a pager that is presently attached to the operator.

The control logic 38 can automatically generate a pager receive signal 48 regardless of whether the message has yet been acknowledged by the pager operator 16. Signal 48 only indicates to the message sender that the message was received by the pager 14 Thus, the message sender is informed that message was successfully received by the pager 14 and that the message does not have to be retransmitted.

The emergency signal 50 is transmitted by depressing button 41 allows the operator 16 to transmit a signal to some predetermined location, independently of any transmitted message. Thus, the operator is provided energy communication without the necessity of a cellular phone.

All the various signals generated by control logic 38 are relayed to the central paging terminal 12 in the same manner utilizing the STS 21. The output controller 44 transmits the various signals according to various communication protocols that are described. The specific logic and systems used to implement the paging system, acknowledge-back circuit 28 and the STS relay circuitry are known to those skilled in the art and are, therefore, not described in detail.

FIG. 4 is a block diagram showing the method for transmitting an acknowledge signal via a secondary transmission source according to the system shown in FIGS. 2 and 3. The message is received from the central paging terminal 12 (FIG. 1) in block 52. The message is acknowledged by physically depressing a button on the pager. For example, a physical acknowledge is initiated by pressing a time/date button on a wrist watch pager.

After the message has been acknowledged, block 56 begins transmitting an acknowledge signal to the STS 21 (FIG. 1). Decision block 58 continues to loop back to the acknowledge transmit block 56 until the acknowledge signal has been successfully received by the STS 21. After successful transmission, block 60 discontinues transmission of the acknowledge signal from pager 14. The acknowledge signal is then relayed by STS 21 to the central paging terminal 12 in block 62.

It should be mentioned that the final destination of the acknowledge signal does not have to be at a physical location next to the central paging terminal 12. Thus, the message when initially transmitted can also be accompanied with a telephone address defining the location for forwarding the acknowledge signal. For example, the message sender can transmit the message from a public phone along with an acknowledge address directing the acknowledge signal to a pager carried by the messenger.

Figure 5:
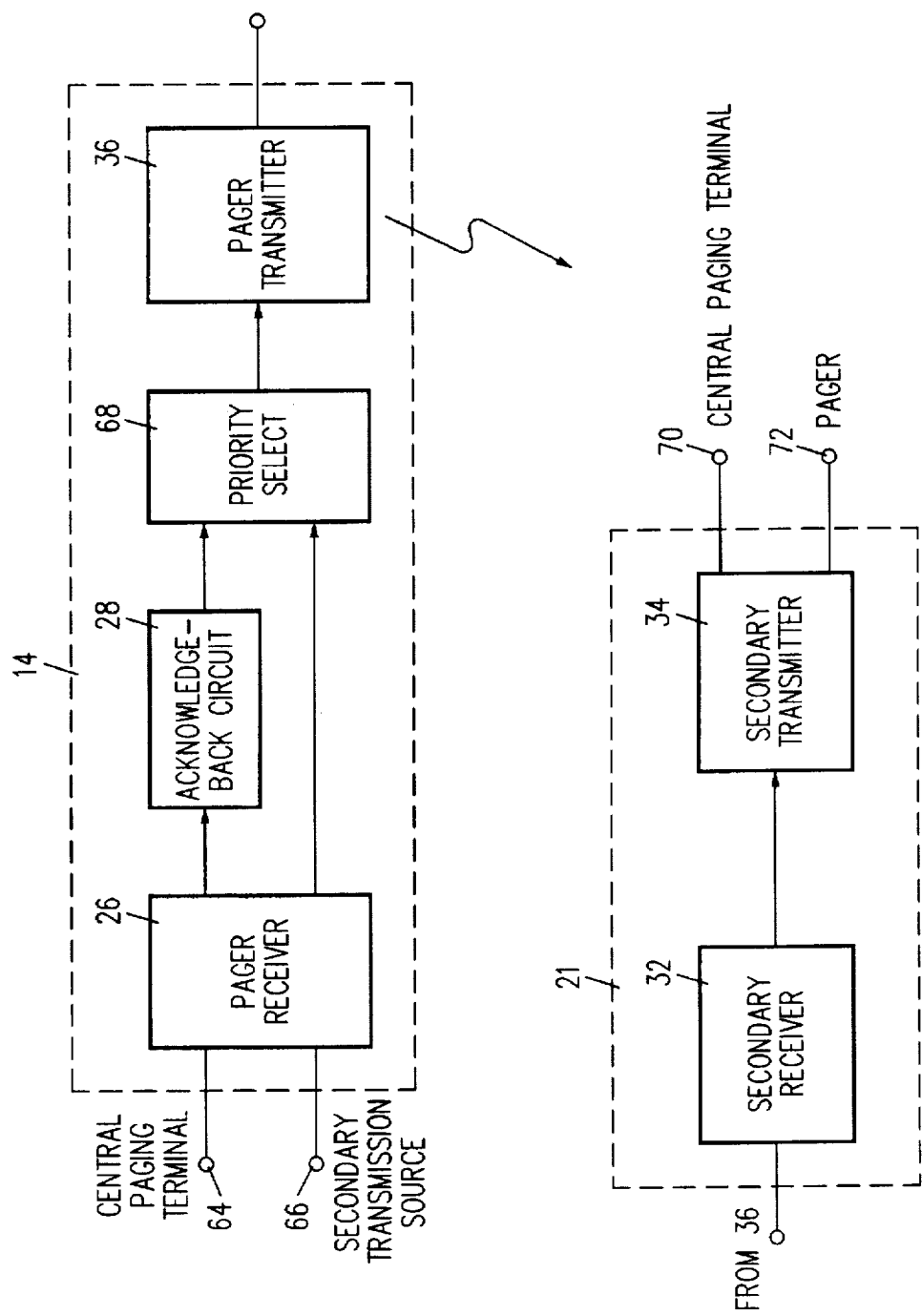
FIG. 5 is a schematic diagram showing an alternative embodiment of the paging system that polls and prioritizes broadcasts from secondary transmission sources.

FIG. 5 is a schematic diagram of an alternative embodiment of the invention that polls to determine availability of the STS. As previously described in FIG. 1, many different secondary transmission sources can relay the acknowledge signal from pager 14. Thus, a polling and priority circuit is integrated into the pager 14 to select between available STS.

The schematic in FIG. 5 is substantially the same as that previously shown in FIG. 3 except that the receiver 26 includes a first terminal 64 for receiving a message from the central paging terminal 12 and a second terminal 66 for receiving a broadcast from STS 21.

A priority select 68 selects which STS 21 will receive the acknowledge signal. For example, it may be preferable to transmit the acknowledge signal first to a cellular phone 24 owned by the operator 16. If the operator 16, however, is not within transmission distance of the cellular phone, the acknowledge signal may then be transmitted to the next available STS, such as pay phone 18 (FIG. 1).

A first output terminal 72 from transmitter 34 broadcasts a signal to pager 14 indicating data relaying acknowledge signals (FIG. 5). A second output terminal 70 transmits the acknowledge signal to the central paging terminal 12. Both the STS 21 and the pager 14 are synchronized to broadcast and receive availability signals over terminals 72 and 66, respectively, at the same time. Synchronized periodic data transmission technology could be used, such as described in copending application Ser. No. 08/149,993 filed Nov. 11, 1993 and entitled; "Portable Wireless Communication Device".

FIG. 6 is a block diagram showing the method for polling multiple secondary transmissions sources in the system above in FIG. 5. Block 74 receives the message from the central paging terminal 12. The message is acknowledged in block 76 initiating the pager to transmit the acknowledge signal. Before transmitting the acknowledge signal, the pager first polls for available STS's in block 78. Decision block 82 then determines which STS's are available. If no STS is available, the pager continues to poll in block 78.

When STS's are identified, the pager selects an appropriate STS in block 80 according to a predetermined priority scheme. For example, the pager may select the secondary transmission source that is the least expensive to relay the acknowledge message. Alternatively, the pager may select the secondary transmission source that has the strongest transmission signal or that is in closest proximity to the pager. The acknowledge signal is then transmitted to the selected STS in block 84.

Figure 7:
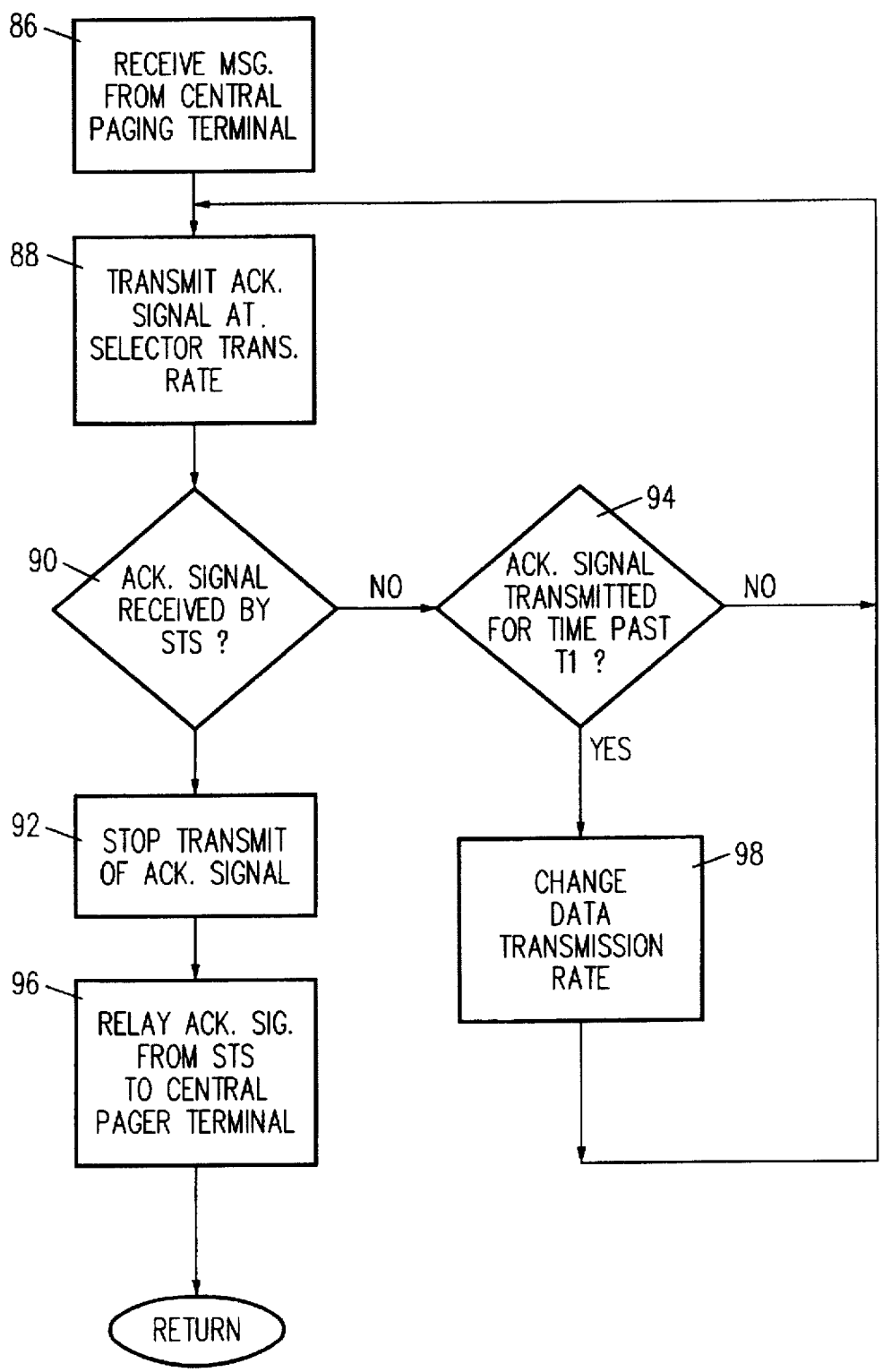
FIG. 7 is a block diagram showing a method for varying the data rate at which the paging system transmits an acknowledge signal.

FIG. 7 is a block diagram showing a method for varying the rate at which the pager periodically transmits the acknowledge signal. For example, it may be necessary to transmit the acknowledge signal periodically at a first rate after initially receiving the message. However, if the acknowledge signal from the pager is not successfully relayed to the STS 21 after a predetermined amount of time, the pager transmission rate can be varied to preserve battery life.

Accordingly, block 86 first receives a message from the central paging terminal 12. The pager in block 88 then transmits the acknowledge signal at a predefined transmission rate. If the acknowledge signal is not successfully communicated to the STS 21, decision block 94 checks to see how long the pager has been transmitting the acknowledge signal.

If the pager has not been transmitting the acknowledge signal for a time T1, decision block 94 jumps back to block 88. The acknowledge signal is then periodically transmitted at the present transmission rate. If the pager 14 has been unsuccessfully transmitting the acknowledge signal longer than time T1, block 98 changes the pager transmission rate and then jumps back to block 88. The page then begins to periodically transmit the acknowledge signal at the new periodic rate. When the acknowledge signal is successfully communicated to the STS, the pager stops transmitting the acknowledge signal in block 92. The acknowledge signal is then relayed by the STS 21 to the central pager terminal 12 in block 96.

Alternatively, the periodic rate at which the pager transmits the acknowledge signal can be varied manually. For example, some messages received by the pager do not have to be immediately acknowledged. Thus, the pager can transmit the acknowledge signal at a slower less power consuming transmission rate. However, if the message is urgent, the pager can be reset into a faster periodic transmission rate as described in block 98.

The following is one scenario of how the paging system described above operates. The pager 14, for example, a wristwatch pager, receives a message from a sender. The pager operator presses button 40 (FIG. 2) acknowledging the message. If the operator is in a car at the time the message is received, the acknowledge signal may be transmitted to a mobile phone owned by the operator and located in the operator's car. The mobile phone then automatically dials out to relay the message to the central paging terminal 12.

Alternatively, the operator may not want to use the car phone. For example, the operator 16 may be next to a public phone that can transmit the acknowledge message at a lower cost. The pager then polls for other available STS's. If the acknowledge message is relayed from a STS owned by someone other than the operator, the pager sends information along with the acknowledge signal that identifies the pager owner. The selected STS accordingly charges the pager owner for relaying the acknowledge signal. Further, by using the emergency button 41 (FIG. 3), pager 14 can contact help utilizing the existing infrastructure that already exists for relaying acknowledge signals.

It is important to note that after the pager operator presses the acknowledge button, the remaining acknowledge sequence is automatic. For example, after the operator acknowledges a message, the pager saves an acknowledge initiation in acknowledge register 43 (FIG. 3). The control logic 38 then continuously or periodically transmits the acknowledge signal until successfully received by the STS.

Having described and illustrated the principles of the invention in a preferred embodiment thereof, it should be apparent that the invention can be modified in arrangement and detail without departing from such principles. We claim all modifications and variation coming within the spirit and scope of the following claims.

What is claimed is:

1. An acknowledge-back paging system comprising:

a low power portable selective call receiver, a central station which includes means for transmitting messages to said selective call receiver;

a first transponder having first radio reception characteristics, a second transponder having second radio reception characteristics, said first radio reception characteristics differing from said second radio reception characteristics, said selective call receiver including a low power transmitter for generating a low power radio signal for transmitting information, message acknowledgment means operative when a selective call receiver receives a message, said message acknowledgment means including, means in said selective call receiver for generating and transmitting through said low power transmitter a polling signal, means in said first and second transponders for receiving a polling signal if said transponders are within range of said lower power transmitter which transmitted said polling signal, and means in said first and second transponders for generating and transmitting a polling acknowledgment signal when a polling signal is receiving, means in said selective call receiver for receiving said polling acknowledgment signal and for generating and transmitting a message acknowledgment signal in response thereto, whereby said paging receiver conserves power by only transmitting a message acknowledgment signal when a polling message transmitted by said selective call receiver has been received by said first or said second transponders.

2. The system recited in claim 1 wherein said polling signal is a very short signal and said message acknowledgment signal is longer than said polling signal.

3. The system recited in claim 1 wherein said paging receiver has the form factor of a wristwatch.

4. The system recited in claim 1 wherein said first transponder is in an automobile and said second transponder is in a lap top computer.

5. The system recited in claim 1 wherein said first transponders transmit a second message acknowledgment message to said central station when said first transponder receives a message acknowledgment signal and said second transponders transmit a third message acknowledgment message to said central station when said first transponder receives a message acknowledgment signal.

* * * * *